United States Patent
Gebert et al.

(10) Patent No.: US 12,552,424 B2
(45) Date of Patent: Feb. 17, 2026

(54) RAIL CONTACT ELEMENT AND DROP OFF DETECTION UNIT

(71) Applicant: Thales Management & Services Deutschland Gmbh, Ditzingen (DE)

(72) Inventors: Thomas Gebert, Bretzfeld-Bitzfeld (DE); Michael Becker, Sersheim (DE); Rainer Klemm, Steinheim (DE); Ingo Rath, Stuttgart (DE)

(73) Assignee: Thales Management & Services Deutschland GmbH, Ditzingen (DE)

( * ) Notice: Subject to any disclaimer, the term of this patent is extended or adjusted under 35 U.S.C. 154(b) by 861 days.

(21) Appl. No.: 17/805,281

(22) Filed: Jun. 3, 2022

(65) Prior Publication Data
US 2022/0289257 A1    Sep. 15, 2022

Related U.S. Application Data

(63) Continuation of application No. PCT/EP2020/085774, filed on Dec. 11, 2020.

(30) Foreign Application Priority Data

Dec. 12, 2019 (EP) .................... 19215723

(51) Int. Cl.
*B61L 1/20*    (2006.01)
*B61L 1/02*    (2006.01)

(52) U.S. Cl.
CPC .. *B61L 1/20* (2013.01); *B61L 1/02* (2013.01)

(58) Field of Classification Search
CPC ..................... B61L 1/02; B61L 1/20
See application file for complete search history.

(56) References Cited

U.S. PATENT DOCUMENTS

| 10,272,930 B2 | 4/2019 | Oldewurtel et al. |
| 10,438,459 B2 | 10/2019 | Otsu |
| 10,444,095 B2 | 10/2019 | Glueck et al. |
| 10,761,261 B2 | 9/2020 | Müller et al. |

(Continued)

FOREIGN PATENT DOCUMENTS

| CN | 1796944 A | 7/2006 |
| CN | 202614953 U | 12/2012 |

(Continued)

OTHER PUBLICATIONS

Heyder et al., "Innovations in the Railway Industry—An Axle Counter Based on Optical Sensors", Signaling & Data Communication, vol. 110, No. 9, Sep. 7, 2018, pp. 92-99.

*Primary Examiner* — Robert J McCarry, Jr.
(74) *Attorney, Agent, or Firm* — Orbit IP, LLP; Marc G. Martino

(57) ABSTRACT

A rail contact element for drop off detection is disclosed, wherein the rail contact element is mountable to a rail and includes a spring element, a main body which holds the spring element and an optical fiber. The spring element is in a tension state or in a relax state depending on a mounting state of the rail contact element. The optical fiber includes an outlet surface for emitting a light beam and the rail contact element further includes a reflector element. The spring element, the reflector element and the optical fiber are arranged so that the influence of the reflector element on the light beam is different in the tension state than in the relax state.

16 Claims, 8 Drawing Sheets

(56) References Cited

U.S. PATENT DOCUMENTS

| | | |
|---|---|---|
| 10,926,782 B2 | 2/2021 | Schicker et al. |
| 11,524,711 B2 | 12/2022 | Schicker et al. |
| 2006/0145066 A1 | 7/2006 | Tamiya |
| 2013/0039613 A1* | 2/2013 | McNeilly ................ G01L 1/246 |
| | | 385/13 |
| 2023/0408351 A1 | 12/2023 | Glueck et al. |

FOREIGN PATENT DOCUMENTS

| | | |
|---|---|---|
| CN | 202641495 U | 1/2013 |
| CN | 103977474 A | 8/2014 |
| CN | 204287515 U | 4/2015 |
| CN | 106414212 A | 2/2017 |
| CN | 107179558 A | 9/2017 |
| DE | 10 2014 100 653 A1 | 7/2015 |
| DE | 10 2015 115 925 B3 | 12/2016 |
| DE | 10 2017 216 811 A1 | 3/2019 |
| EP | 1 260 420 A1 | 11/2002 |
| EP | 2 962 915 A1 | 1/2016 |
| EP | 3 069 952 A1 | 9/2016 |
| EP | 3 459 811 A1 | 3/2019 |
| JP | S59-168120 U | 11/1984 |
| JP | S63-137314 U | 9/1988 |
| JP | 2018-170394 A | 11/2018 |
| RU | 2674547 C1 | 12/2018 |
| WO | 2016/188770 A1 | 12/2016 |
| WO | 2019/057491 A1 | 3/2019 |

* cited by examiner

RAIL CONTACT ELEMENT AND DROP OFF DETECTION UNIT

CROSS-REFERENCE TO RELATED APPLICATIONS

This continuation application claims priority to PCT/EP2020/085774 filed on Dec. 11, 2020 which has published as WO 2021/116412 A1 and also the European application number 19215723.8 filed on Dec. 12, 2019, the entire contents of which are fully incorporated herein with these references.

DESCRIPTION

Field of the Invention

The invention concerns a rail contact element for drop off detection, wherein the rail contact element is mountable to a rail and comprises a spring element, a main body which holds the spring element and an optical fiber, wherein the spring element is in a tension state or in a relax state depending on a mounting state of the rail contact element. The invention further concerns a drop off detection unit.

Background of the Invention

An according rail contact element is disclosed in EP3459811A1.

In order to make railway systems safe and reliable rail monitoring elements, e.g., axle counters, can be used to determine certain properties of the rail and/or a train travelling on the rail. Often, rail monitoring elements need to be mounted to a rail and be in surface contact with the rail. A drop-off situation, i. e. a situation where the rail monitoring element has fallen off the rail or is only loosely connected, needs to be detected in order to ensure a proper determination of the required properties of the rail and/or the train travelling on the rail.

In EP2962915A1 a supervision device for monitoring of a mounting state of a sensor element is described. The mounting state of the sensor element is monitored by using an electrical contact, which is closed when the sensor element is mounted to a rail and interrupted when the sensor element is dismounted. This solution is mechanically elaborate and costly.

In EP3459811A1 a strain gauge arrangement with an optical fiber having a Fiber Bragg Grating (FBG) as a strain sensor element is described. The optical fiber is held in an elastically deformed state when the strain gauge arrangement is attached to a rail. Drop off can be detected by detecting a change in frequency of the light detected of the FBG due to a change of strain acting on the FBG. The optical fiber might easily be damaged during the manufacturing process which makes the manufacturing difficult and expensive.

SUMMARY OF THE INVENTION

Object of the Invention

It is an object of the invention to provide an improved rail contact element and an improved rail monitoring element.

Description of the Invention

This object is solved by a rail contact element according to claim 1. This object is also solved by a drop off detection unit according to claim 11.

The rail contact element for drop off detection is mountable to a rail and comprises a spring element, a main body which holds the spring element and an optical fiber. A rail contact element is an element mountable to a rail in order to be in a contact, in particular in a surface contact or via fixing means (e.g., glue), with the rail. The spring element is in a tension state or in a relax state depending on a mounting state of the rail contact element.

A spring element is an elastic object that can store mechanical energy. Different kinds of spring elements can be used, e.g., flat springs, coil springs, also called helical springs. Springs can for example be of tension kind, of extension kind, of torsion kind. The tension state of the spring element is the state when energy is stored in the spring element. The relax state is the state when no energy or less energy is stored compared to the tension state of the spring element.

The mounting state of the rail contact element is either mounted to a rail, for example by being attached to the rail or not mounted to the rail, e.g., dropped off the rail or loosely mounted. The rail contact element is mounted to the rail when it is properly attached to the rail. In this context the rail contact element fulfils the function of monitoring the proper mounting state of for example a bigger unit which comprises the rail contact element. The bigger unit might for example be a rail monitoring element for axle counting. When the rail contact element detects a proper mounting state then it can be assumed that the respective rail monitoring element can perform its function properly. On the other hand, when the rail contact element is not in mounted state, it could be unmounted from the rail, e.g., completely dropped off, or incorrectly mounted, i.e., loosely mounted.

The spring element can be in the tension state when the rail contact element is in mounted state and the spring element can be in the relax state when the rail contact element is in unmounted state. It is also possible that the spring element is in the relax state when the rail contact element is in mounted state and that the spring element is in the tension state when the rail contact element is in unmounted state.

The optical fiber comprises an outlet surface for emitting a light beam into the rail contact element. The rail contact element further comprises a reflector element. The reflector element might be a surface with the ability to reflect incoming light at least to a certain degree. The spring element, the reflector element, the optical fiber, in particular with its outlet surface, are arranged so that the influence of the reflector element on the light beam is different in the tension state than in the relax state. The influence of reflector element on the light beam might for example include changing the direction in which the light beam is reflected and/or the degree of reflection of the light beam. The degree of reflection of the light beam is for example the share of the overall intensity of the light that is being reflected.

The main body of the rail contact element is preferably made of optically absorbing material. Any light that is being emitted towards a surface of the main body might then be rather absorbed than reflected.

The invention might also be realized using several optical fibers emitting several light beams. The several light beams might then interact with one or more reflector elements.

In an embodiment of the invention the position of the reflector element relative to the optical fiber and/or the orientation of the reflector element relative to the outlet surface of the optical fiber are different in the relax state than in the tension state of the spring element. The different reflection behaviour could then be detected by a detection unit. The mounting state of the rail contact element influences the state of the spring element and the state of the spring element in turn influences the direction of the reflection of the light beam and/or the degree of reflection of the light beam and/or the degree of absorption of the light beam.

In an embodiment of the invention the spring element, the reflector element and the optical fiber are arranged so that either in the tension state or in the relax state of the spring element, the light beam can be reflected back into the optical fiber. The light beam reflected back into the optical fiber could then be detected using for example the detection unit. Preferably in one state—relax state or tension state—of the spring element, all or almost all the light is reflected back into the optical fiber and in the respective other state of the spring element, no or almost no light is reflected back into the optical fiber. It is also possible that in one state—relax state or tension state—simply more light is reflected back into the optical fiber than in the respective other state. If the difference is big enough to be detected by the e.g., detector, it can be used to detect the mounting state of the rail element.

Alternatively or additionally, the light beam might be reflected back into more than one optical fiber and e.g., be detected by one common detector or by more than one detector.

In an embodiment the optical fiber is fixed to the spring element. The spring element and the optical fiber are arranged so that the light beam leaving the optical fiber through the outlet surface can be emitted in a first direction when the spring element is in the tension state and the light beam leaving the optical fiber through the outlet surface can be emitted in a second direction when the spring element is in the relax state. The first direction is different from the second direction. The optical fiber is fixed to the spring element and meant to stay fixed to it during operation. When demounting the rail contact element, it might nonetheless be possible to detach the optical fiber from the spring element. In this embodiment the direction of the light emitted from the optical fiber changes with the mounting state of the rail contact element.

In an alternative embodiment the reflector element is mounted to the spring element. The spring element and the reflector element are arranged so that the light beam—when meeting the reflector element—can be reflected in a third direction when the spring element is in the tension state and the light beam—when meeting the reflector element—can be reflected in a fourth direction when the spring element is in the relax state. The third direction is different from the fourth direction. In this embodiment the direction of reflection by the reflector element changes with the mounting state of the rail contact element.

The reflector element might be directly mounted on the spring element. It is also possible that the reflector element is indirectly mounted on the spring element. This is for example the case when another element is mounted in between the reflector element and the spring element.

In an embodiment the rail contact element comprises an optical absorber element. The optical absorber element, the reflector element, the optical fiber and the spring element are arranged so that the light beam can be reflected back into the optical fiber when the spring element is in the tension state and the light beam can be absorbed by the optical absorber element when the spring element is in the relax state.

The optical absorber element might comprise a surface with the ability to absorb incoming light at least to a certain degree. The spring element, the reflector element, the optical absorber element, the optical fiber with its outlet surface are arranged so that the influence of the optical absorber element and/or the reflector element on the light beam is different in the tension state than in the relax state. The influence of optical absorber element on the light beam might for example include the degree of absorption of the light beam. The degree of absorption of the light beam is for example the share of the overall intensity of the light that is being absorbed.

In the context of this disclosure the light beam is "reflected back" if more light of the light beam is reflected that is absorbed. In the context of this disclosure the light beam is "absorbed" if more light of the light beam is absorbed than is reflected. Preferably in one state—relax state or tension state—of the spring element, all or almost all the light is reflected back into the optical fiber and in the respective other state of the spring element, all or almost all light is absorbed. It is also possible that in one state—relax state or tension state—simply more light is reflected back into the optical fiber than in the respective other state. If the difference is big enough to be detected by the e.g., detector, it can be used to detect the mounting state of the rail element.

The optical absorber element with its ability to absorb the incoming light at least to a certain degree might be a separate element which is attached to the main body of the rail contact element. The optical absorber element might also be part of the main body. The optical absorber element may be for example part of the main body if the main body itself is made of light absorbing material.

In an embodiment the optical absorber element is mounted to the spring element. The optical absorber might be directly mounted on the spring element. It is also possible that the optical absorber element is indirectly mounted on the spring element. This is for example the case when another element is mounted in between the optical absorber element and the spring element. The other element might be the reflector element.

In a highly preferred embodiment the rail monitoring element comprises a sensor element, in particular a strain sensor element like for example a sensor-fiber with an inscribed Fiber Bragg Grating, FBG. Such a rail contact element might for example be used as rail monitoring element an axle counter for trains in a rail network. Such a rail monitoring element might comprise a rail contact element as described above. The rail contact element can detect when the rail monitoring element is no longer attached to the rail and that the function of the rail monitoring element might therefore be impaired.

The invention also concerns a drop off detection unit comprising a rail contact element as described above and might further comprise a detector for detecting the light that is reflected back into the optical fiber. This detector might in some embodiments be configured to detect light in different fibers that are connected to the detector.

Further advantages can be extracted from the description and the enclosed drawings. The features mentioned above and below can be used in accordance with the invention either individually and collectively in any combination. The embodiments mentioned are not to be understood as exhaustive, but are rather embodiments of the invention.

BRIEF DESCRIPTION OF THE DRAWINGS

Further features and advantages of the invention are shown in the drawings.

DETAILED DESCRIPTION OF THE PREFERRED EMBODIMENTS

Figure 1:
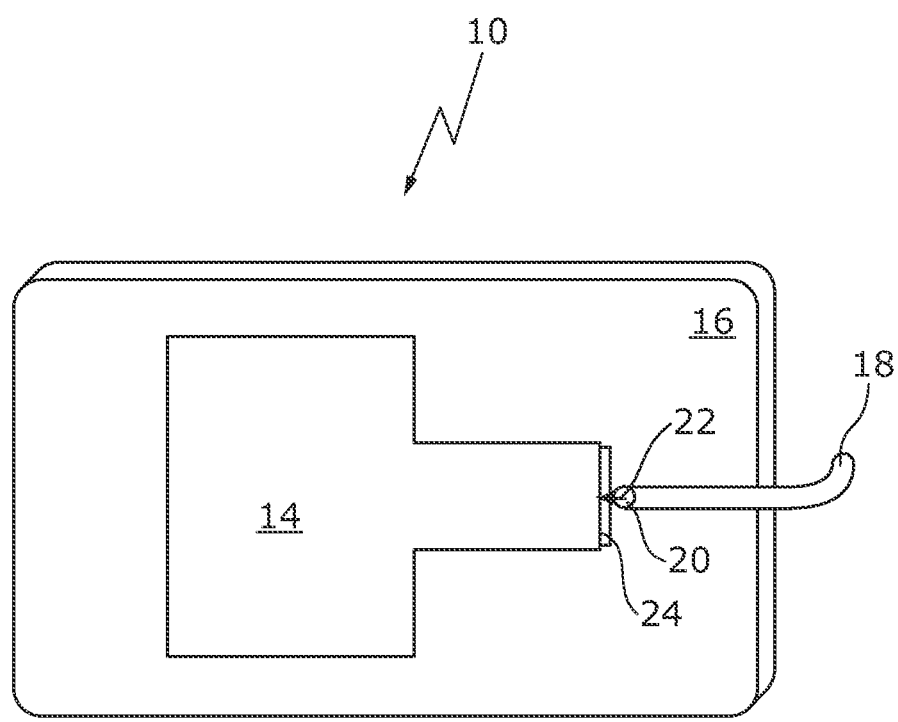
FIG. 1 shows a schematic view of a rail contact element.

FIG. 1 shows a schematic view of a rail contact element 10. Attached to the front surface of the main body 16 of the rail contact element 10 is a spring element 14. This front surface of the main body 16 may be attached to a rail 12 (FIG. 2) to put the rail contact element 10 in a mounting state "mounted" to the rail 12. The rail contact element 10 comprises an optical fiber 18, through which a light beam 22 might travel. The light beam 22 might be emitted through an outlet surface 20 of the optical fiber 18.

Figure 2:
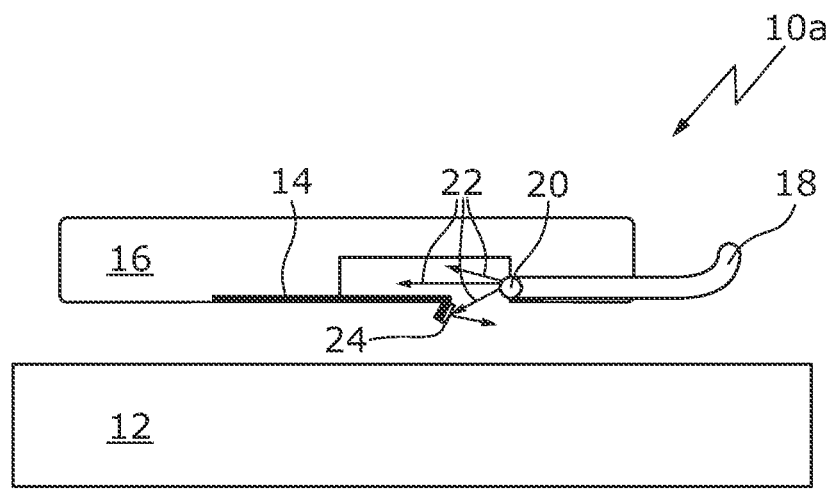
FIG. 2 shows an embodiment of a rail contact element for drop off detection in detached state where a fiber is stationary mounted and a reflector element is attached to a spring element.

FIG. 2 shows an embodiment of a rail contact element 10a for drop off detection in a state not mounted to the rail 12. The optical fiber 18 is attached to the main body 16, which is made of light absorbing material. The spring element 14 is attached to the main body 16. A reflector element 24 is attached to the spring element 14. The spring element 14 is in relax state when the rail contact element 10a is not mounted to the rail 12. The mounting state is "not mounted", which could also be called "dropped off". In this state the orientation and/or the position of the reflector element 24 are such that the light beams 22 that are emitted through the optical fiber's outlet surface 20 are reflected in a direction other than the direction back to the outlet surface. I.e., the light beams 22 are not reflected back into the optical fiber 18 by the reflector element 24. Some of the light is absorbed by the main body 16.

Figure 3:
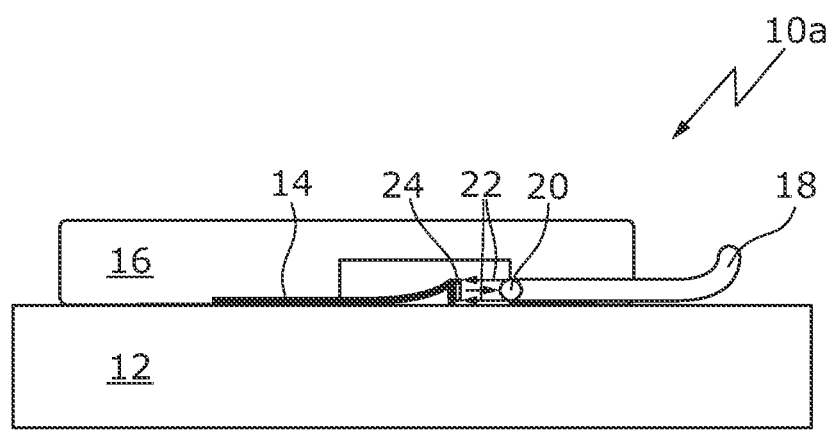
FIG. 3 shows the embodiment of FIG. 2 in a state attached to the rail.

FIG. 3 shows the embodiment of FIG. 2 when the rail contact element 10a is mounted to the rail 12. The mounting state is "mounted" and the spring element 14 is in tension state. When mounting the rail contact element 10a to the rail, a protrusion of the spring element 14 gets into contact with the rail and is pushed in direction of the main body 16 in a cavity of the main body 16. This puts the spring element 14 into its tension state and makes the reflector element 24 change its position and its orientation. In this state the orientation and the position of the reflector element 24 are such that the light beams 22 that are emitted through the optical fiber's outlet surface 20 are reflected by the reflector element 24 in direction to the outlet surface 20. I.e., the light beams 22 are reflected back into the optical fiber 18 by the reflector element 24.

In the embodiment of FIGS. 2 and 3, the light beam 22 is be reflected in one direction when the spring element 14 is in the tension state and that the light beam 22 is reflected in another direction when the spring element 14 is in the relax state.

Figure 4:
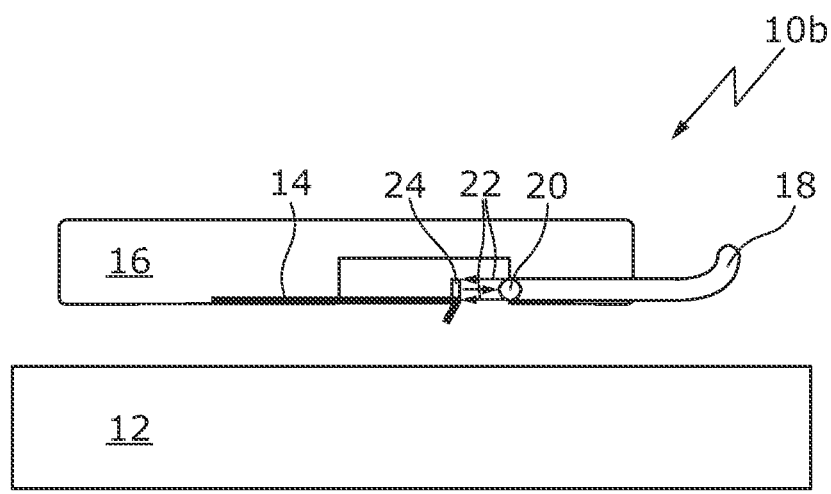
FIG. 4 shows an embodiment of a rail contact element for drop off detection in detached state where a fiber is stationary mounted and a reflector element is attached to a spring element.

FIG. 4 shows an embodiment of a rail contact element 10b for drop off detection in a state not mounted to the rail 12. The optical fiber 18 and the spring element 14 are mounted to the main body 16. A reflector element 24 is attached to the spring element 14. The spring element 14 is in relax state when the rail contact element 10b is not mounted to the rail 12. In this state the orientation and/or the position of the reflector element 24 are such that the light beams 22 that are emitted through the optical fiber's outlet surface 20 are reflected in direction to the outlet surface 20. In this embodiment the light beams 22 are reflected back into the optical fiber 18 by the reflector element 24.

Figure 5:
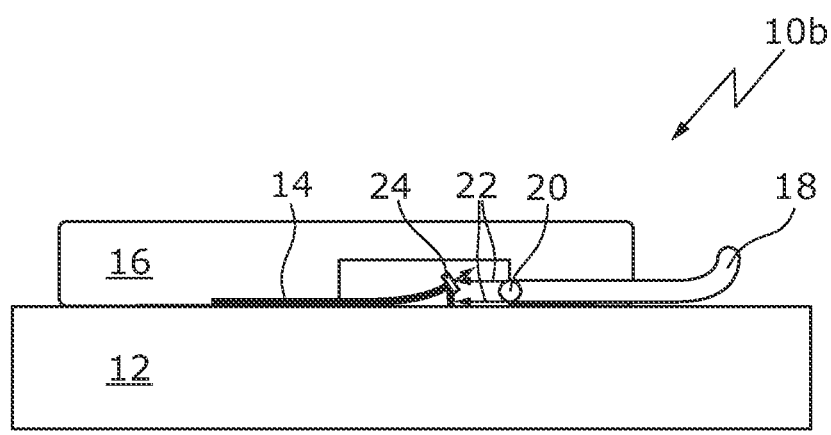
FIG. 5 shows the embodiment of FIG. 4 in a state attached to the rail.

FIG. 5 shows the embodiment of FIG. 4 when the rail contact element 10b is mounted to the rail 12. The mounting state is "mounted" and the spring element 14 is in tension state. When mounting the rail contact element 10b to the rail, a protrusion of the spring element 14 gets into contact with the rail and is pushed in direction of the main body 16 in a cavity of the main body 16. This puts the spring element 14 into its tension state and makes the reflector element 24 change its position and its orientation. In this state the orientation and/or the position of the reflector element 24 are such that the light beams 22 that are emitted through the optical fiber's outlet surface 20 are reflected by the reflector element in a direction other than the direction back to the outlet surface 20. In this embodiment the light beams 22 are not reflected back into the optical fiber 18 by the reflector element 24. Some of the light is absorbed by the protrusion and/or the main body.

In the embodiment of FIGS. 4 and 5, the light beam 22 is reflected in one direction when the spring element 14 is in the tension state and that the light beam 22 is reflected in another direction when the spring element 14 is in the relax state.

Figure 6:
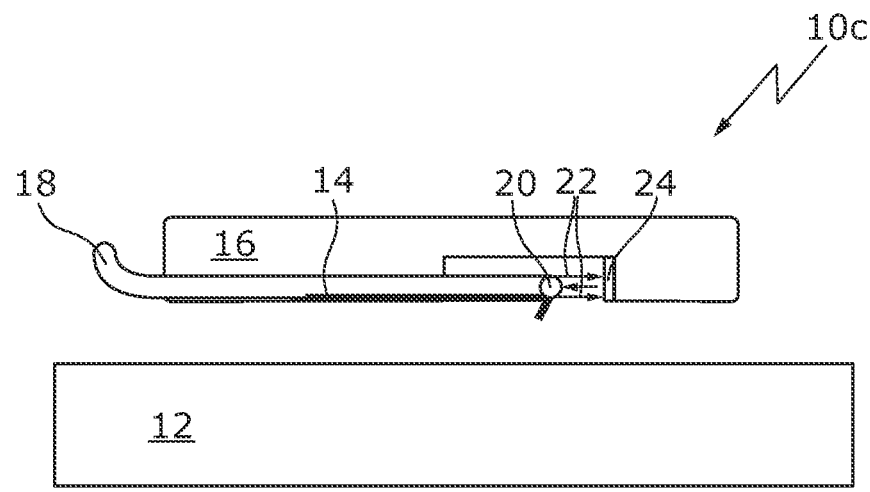
FIG. 6 shows an embodiment of a rail contact element for drop off detection in detached state where an optical fiber is attached to a spring element.

FIG. 6 shows an embodiment of a rail contact element 10c for drop off detection in a state not mounted to the rail 12. The main body 16 is made of light absorbing material. The spring element 14 is mounted to the main body 16 and the optical fiber 18 is attached to the spring element 14. A reflector element 24 is attached to the main body 16. The spring element 14 is in relax state when the rail contact element 10c is not mounted to the rail 12. In this state the orientation of the outlet surface 20 of the optical fiber 18 and the orientation of the reflector element 24 are such that the light beams 22 that are emitted through the optical fiber's outlet surface 20 are emitted in direction to the reflector element and are reflected back into the optical fiber 18 by the reflector element 24.

Figure 7:
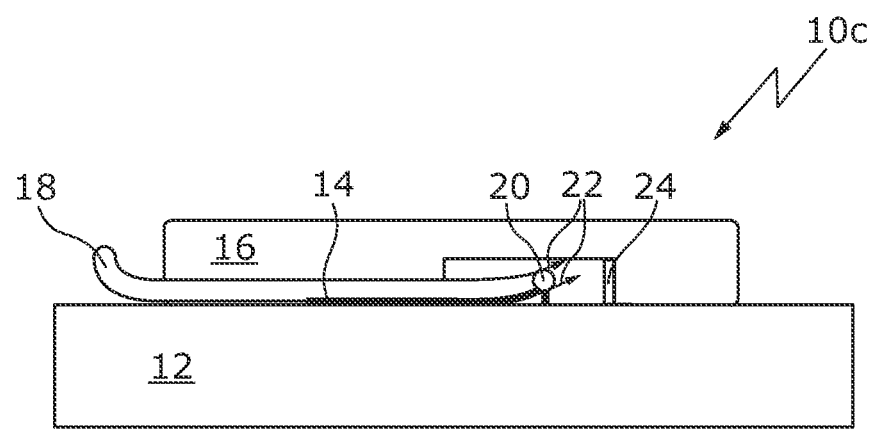
FIG. 7 shows the embodiment of FIG. 6 in a state attached to the rail.

FIG. 7 shows the embodiment of FIG. 6 when the rail contact element 10c is mounted to the rail 12. The mounting state is "mounted" and the spring element 14 is in tension state. When mounting the rail contact element 10c to the rail, a protrusion of the spring element 14 gets into contact with the rail and is pushed in direction of the main body 16 into a cavity of the main body 16. This puts the spring element 14 into its tension state and changes the direction of the outlet surface 20. In this state the orientation of the outlet surface 20 of the optical fiber relative to the position and orientation of the reflector element is such that the light beams 22 that are emitted through the optical fiber's outlet surface 20 are not reflected back into the optical fiber 18 by the reflector element 24. Some of the light is absorbed by the main body 16.

In the embodiment of FIGS. 6 and 7, the light beams 22 are be emitted in one direction when the spring element 14 is in the tension state and are be emitted in another direction when the spring element 14 is in the relax state.

Figure 8:
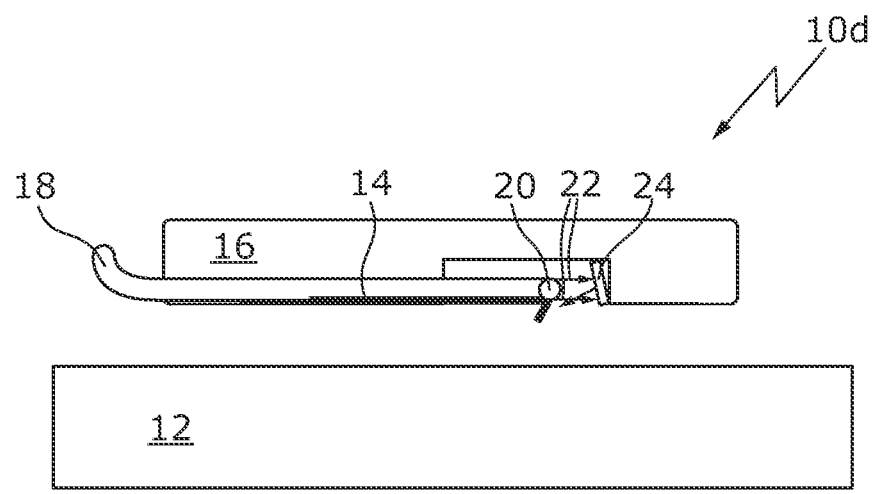
FIG. 8 shows an embodiment of a rail contact element for drop off detection in detached state where an optical fiber is attached to a spring element.

FIG. 8 shows an embodiment of a rail contact element 10d for drop off detection in a state not mounted to the rail 12. The main body 16 is made of light absorbing material. The spring element 14 is mounted to the main body 16 and the optical fiber 18 is attached to the spring element 14. A reflector element 24 is attached to the main body 16. The spring element 14 is in relax state when the rail contact element 10d is not mounted to the rail 12. In this state the orientation of the outlet surface 20 of the optical fiber relative to the position and orientation of the reflector element is such that the light beams 22 that are emitted through the optical fiber's outlet surface 20 are not reflected back into the optical fiber 18 by the reflector element 24.

Figure 9:
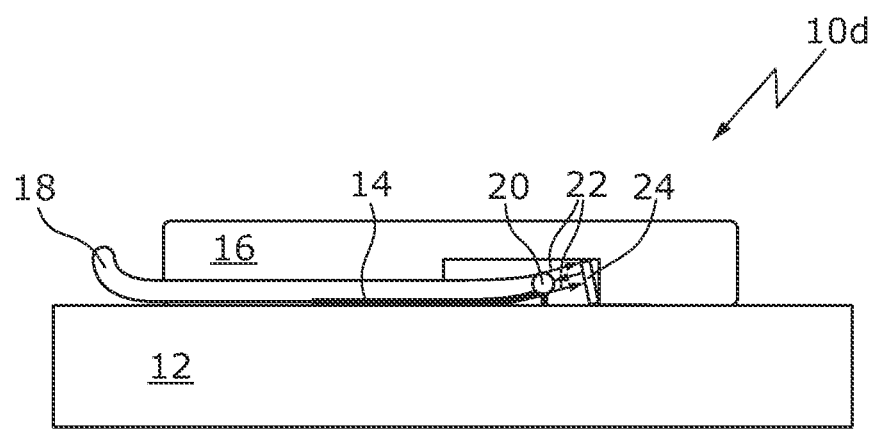
FIG. 9 shows the embodiment of FIG. 8 in a state attached to the rail.

FIG. 9 shows the embodiment of FIG. 8 when the rail contact element 10d is mounted to the rail 12. The mounting state is "mounted" and the spring element 14 is in tension state. In this state the orientation of the outlet surface 20 of the optical fiber 18 and the orientation of the reflector element 24 are such that the light beams 22 that are emitted through the optical fiber's outlet surface 20 are emitted in direction to the reflector element 24 and are reflected back into the optical fiber 18 by the reflector element 24.

In the embodiment of FIGS. 8 and 9, the light beam 22 can be emitted in one direction when the spring element 14 is in the tension state, and in another direction when the spring element 14 is in the relax state.

Figure 10:
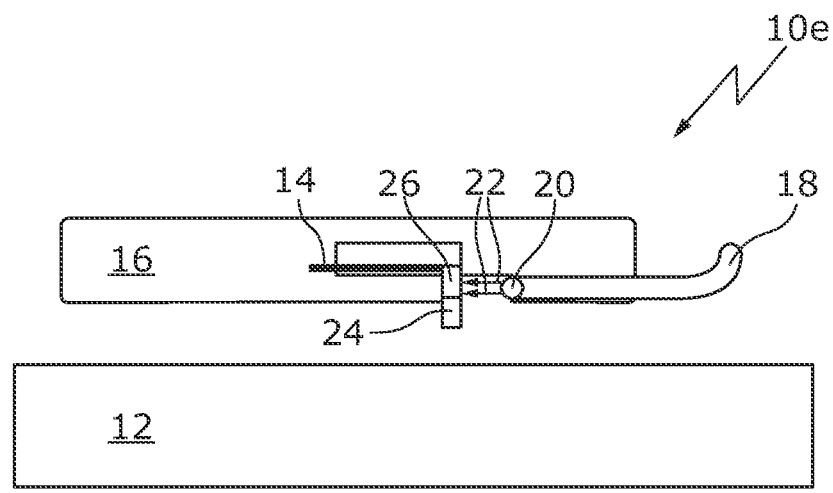
FIG. 10 shows an embodiment of a rail contact element for drop off detection in detached state where a fiber is stationary mounted and a reflector element is indirectly attached to a spring element and an optical absorber element is directly attached to a spring element.

FIG. 10 shows an embodiment of a rail contact element 10e for drop off detection in a state not mounted to the rail 12. The optical fiber 18 and the spring element 14 are attached to the main body 16. An optical absorber element 26 is directly attached to the spring element 14. The reflector element 24 is indirectly attached to the spring element 14: The reflector element 24 is attached to the optical absorber element 26, which in turn is attached to the spring element 14. The spring element 14 is in relax state when the rail contact element 10e is not mounted to the rail 12. In this state the position of the reflector element 24 and the optical absorber element 26 are such that the light beams 22 that are emitted through the optical fiber's outlet surface 20 meet the absorber element 26 and are absorbed. The light beams 22 do not meet the reflector element 24 and are therefore not reflected back into the optical fiber 18 by the reflector element 24.

Figure 11:
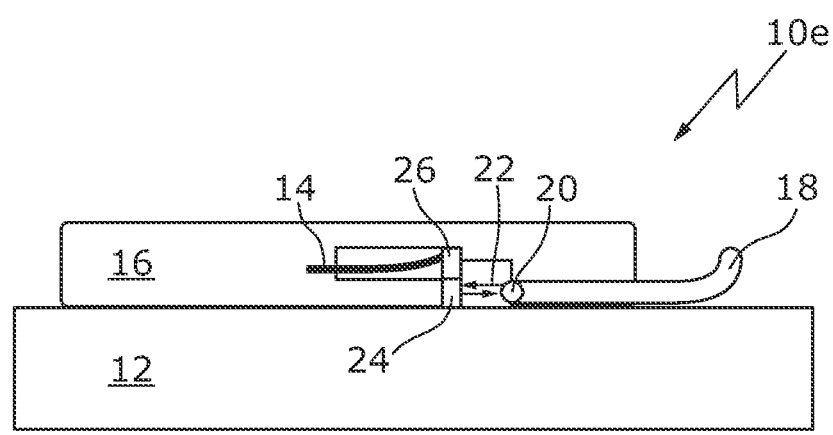
FIG. 11 shows the embodiment of FIG. 10 in a state attached to the rail.

FIG. 11 shows the embodiment of FIG. 10 when the rail contact element 10e is mounted to the rail 12. The mounting state is "mounted" and the spring element 14 is in tension state. In this state the position of the reflector element 24 and the optical absorber element 26 are such that the light beams 22 that are emitted through the optical fiber's outlet surface 20 meet the reflector element 24 and are reflected back into the optical fiber 18 by the reflector element 24. Most of the light beams 22 do not meet the absorber element 26.

Figure 12:
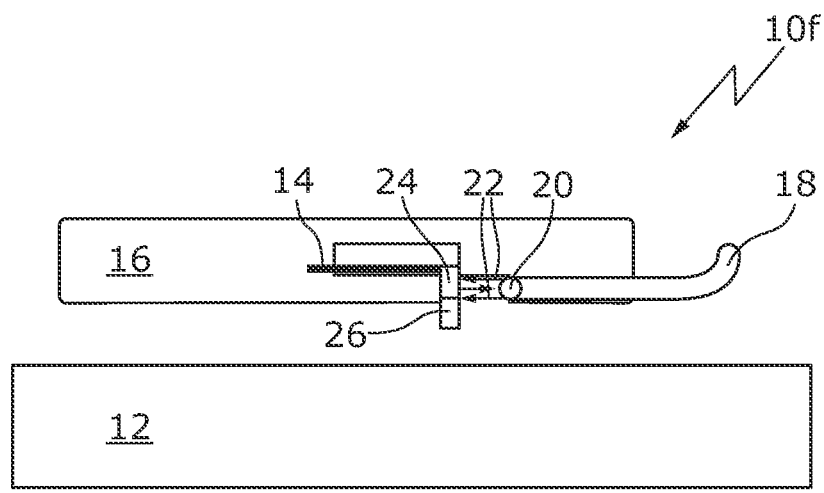
FIG. 12 shows an embodiment of a rail contact element for drop off detection in detached state where a fiber is stationary mounted and a reflector element is directly attached to a spring element and an optical absorber element is indirectly attached to a spring element.

FIG. 12 shows an embodiment of a rail contact element 10f for drop off detection in a state not mounted to the rail 12. The optical fiber 18 and the spring element 14 are attached to the main body 16. The reflector element 24 is directly attached to the spring element 14. The optical absorber element 26 is indirectly attached to the spring element 14: The optical absorber element 26 is attached to the reflector element 24, which in turn is attached to the spring element 14. The spring element 14 is in relax state when the rail contact element 10f is not mounted to the rail 12. In this state the position of the reflector element 24 and the optical absorber element 26 are such that the light beams 22 that are emitted through the optical fiber's outlet surface 20 meet the reflector element 24 and are reflected back into the optical fiber 18 by the reflector element 24. The light beams 22 do not meet the absorber element 26.

Figure 13:
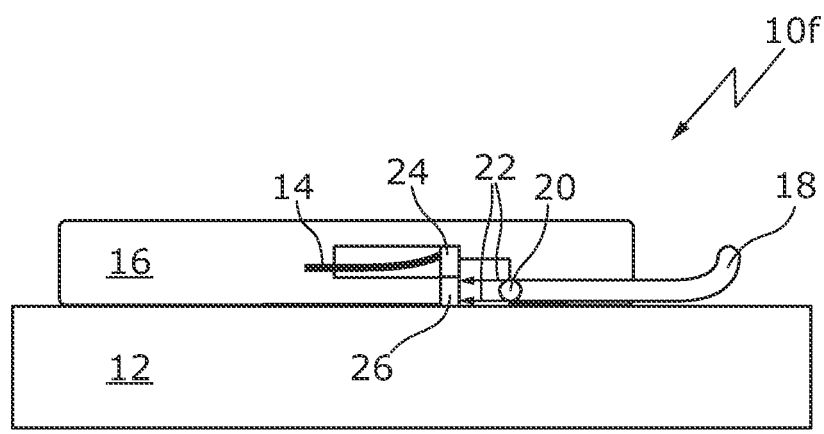
FIG. 13 shows the embodiment of FIG. 12 in a state attached to the rail.

FIG. 13 shows the embodiment of FIG. 12 when the rail contact element 10f is mounted to the rail 12. The mounting state is "mounted" and the spring element 14 is in tension state. In this state the position of the reflector element 24 and the optical absorber element 26 are such that the light beams 22 that are emitted through the optical fiber's outlet surface 20 meet the optical absorber element 26 and are absorbed. The light beams 22 do not meet the reflector element 24 and are therefore not reflected back into the optical fiber 18 by the reflector element 24.

Figure 14:
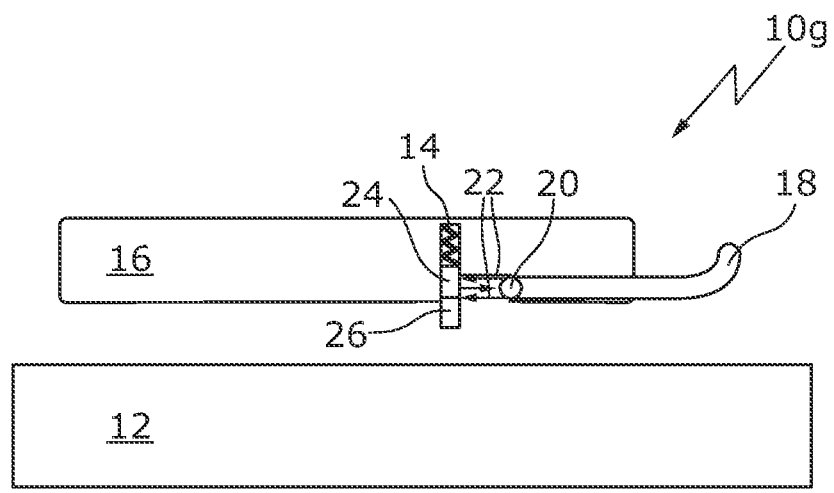
FIG. 14 shows an embodiment of a rail contact element for drop off detection in detached state where a fiber is stationary mounted and a reflector element is directly attached to a spring element and an optical absorber element is indirectly attached to a spring element.

FIG. 14 shows an embodiment of a rail contact element 10g for drop off detection in a state not mounted to the rail 12. The optical fiber 18 and the spring element 14 are attached to the main body 16. In this embodiment, the spring element 14 is a helical spring. The reflector element 24 is directly attached to the spring element 14. The optical absorber element 26 is indirectly attached to the spring element 14. It is attached to the reflector element 24, which in turn is attached to the spring element 14. The spring element 14 is in relax state when the rail contact element 10g is not mounted to the rail 12. In this state the position of the reflector element 24 and the optical absorber element 26 are such that the light beams 22 that are emitted through the optical fiber's outlet surface 20 meet the reflector element 24 and are reflected back into the optical fiber 18 by the reflector element 24. Most of the light beams 22 do not meet the absorber element 26.

Figure 15:
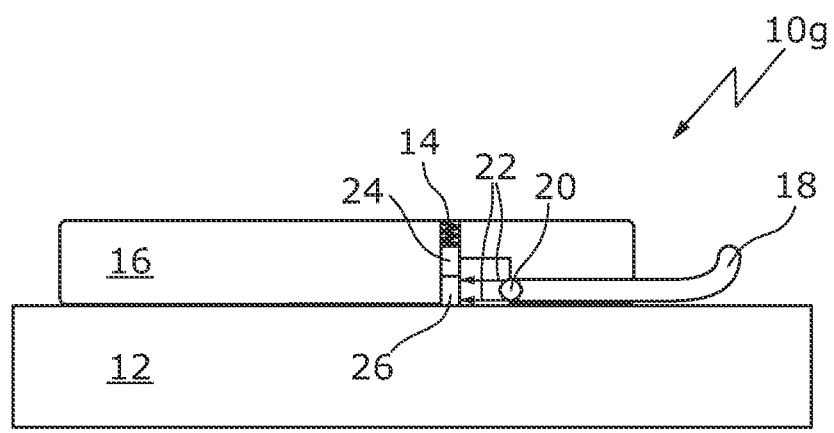
FIG. 15 shows the embodiment of FIG. 14 in a state attached to the rail.

FIG. 15 shows the embodiment of FIG. 14 when the rail contact element 10g is mounted to the rail 12. The mounting state is "mounted" and the spring element 14 is in tension state. In this state the position of the reflector element 24 and the optical absorber element 26 are such that the light beams 22 that are emitted through the optical fiber's outlet surface 20 meet the optical absorber element 26 and are absorbed. The light beams 22 do not meet the reflector element 24 and are therefore are in this mounting state of this embodiment not reflected back into the optical fiber 18 by the reflector element 24.

A helical spring (or other kind of spring elements) can also be used for configurations analogue to the embodiments shown in FIGS. 2-13.

In the embodiments shown FIG. 10-15 the cavity in which the spring element 14 can be bended is designed such that the reflector element 24 and/or the optical absorber element 26 is/are guided by the main body 16 or another guiding element.

According to the invention light is guided through a fiber inside the rail contact element and a spring element is used in order to guide the light emitted from the outlet surface of the fiber to the reflector element or to position the reflector element in the beam path of the light emitted from the outlet surface in either the tension state or relax state of the spring element and to guide the light emitted from the outlet surface of the fiber beneath the reflector element or to position the reflector element out of the beam path of the light emitted from the outlet surface in the respective other state of the spring element.

LIST OF REFERENCE SIGNS 10, 10a, 10b, 10c, 10d, 10e, 10f, 10g rail contact element
12 rail
14 spring element
16 main body
18 optical fiber
20 outlet surface
22 light beam
24 reflector element
26 optical absorber element

CITED REFERENCES

[1] EP3459811A1
[2] EP2962915A1

What is claimed is:

1. A rail contact element for drop off detection, wherein the rail contact element is mountable to a rail and comprises:
    a spring element;
    a main body which holds the spring element; and
    an optical fiber;
    wherein the spring element is in a tension state or in a relax state depending on a mounting state of the rail contact element;
    wherein, when the rail contact element is not mounted to the rail the spring element is in the relax state and not in direct or indirect contact with the rail, and wherein, when the rail contact element is mounted to the rail the spring element is in the tension state and is elastically deformed by direct or indirect contact with the rail;
    wherein the optical fiber comprises an outlet surface for emitting a light beam;
    wherein the rail contact element further comprises a reflector element; and
    wherein the spring element, the reflector element and the optical fiber are arranged where the influence of the reflector element on the light beam is different in the tension state than in the relax state.

2. The rail contact element according to claim 1, wherein the position of the reflector element relative to the optical fiber and/or the orientation of the reflector element relative to the outlet surface of the optical fiber is/are different in the relax state than in the tension state of the spring element.

3. The rail contact element according to claim 1, wherein the spring element, the reflector element and the optical fiber are arranged where either in the tension state or in the relax state of the spring element the light beam can be reflected back into the optical fiber.

4. The rail contact element according to claim 1, wherein the optical fiber is fixed to the spring element, and that the spring element and the optical fiber are arranged where the light beam can be emitted in a first direction when the spring element is in the tension state, and that the light beam can be emitted in a second direction when the spring element is in the relax state.

5. The rail contact element according to claim 1, wherein the reflector element is mounted to the spring element and that the spring element and the reflector element are arranged where the light beam can be reflected in a third direction when the spring element is in the tension state and that the light beam can be reflected in a fourth direction when the spring element is in the relax state.

6. The rail contact element according to claim 1, wherein the rail contact element further comprises an optical absorber element, wherein the optical absorber element, the reflector element, the optical fiber, and the spring element are arranged where the light beam can be reflected back into the optical fiber when the spring element is in the tension state and that the light beam can be absorbed by the optical absorber element when the spring element is in the relax state.

7. The rail contact element according to claim 1, wherein the rail contact element further comprises an optical absorber element, wherein the optical absorber element, the reflector element, the optical fiber, and the spring element are arranged where the light beam can be reflected back into the optical fiber when the spring element is in the relax state and that the light beam can be absorbed by the optical absorber element when the spring element is in the tension state.

8. The rail contact element according to claim 6, wherein the optical absorber element is attached to the main body or is part of the main body.

9. The rail contact element according to claim 7, wherein the optical absorber element is attached to the main body or is part of the main body.

10. The rail contact element according to claim 6, wherein the optical absorber element is mounted to the spring element.

11. The rail contact element according to claim 7, wherein the optical absorber element is mounted to the spring element.

12. The rail contact element according to claim 1, wherein it further comprises a sensor element.

13. The rail contact element according to claim 1, wherein it further comprises a sensor element being a strain sensor element.

14. The rail contact element according to claim 1, wherein it further comprises a sensor element being a sensor-fiber with an inscribed Fiber Bragg Grating.

15. A drop off detection unit comprising the rail contact element according to claim 1 and a detector for detecting the light that is reflected back into the optical fiber.

16. The rail contact element according to claim 1, wherein the reflector element is arranged to at least partially reflect the light beam emitted from the outlet surface of the optical fiber in the tension state and/or the relax state of the spring element.

* * * * *